United States Patent
Dea et al.

(10) Patent No.: US 6,193,895 B1
(45) Date of Patent: Feb. 27, 2001

(54) MULTIPURPOSE VEHICLE COOLANT RECYCLING DEVICE AND METHOD FOR RECYCLING VEHICLE COOLANT

(75) Inventors: William S. Dea, Bloomington; Todd Moore, Eagan, both of MN (US)

(73) Assignee: Century Mfg. Co., Bloomington, MN (US)

( * ) Notice: Subject to any disclaimer, the term of this patent is extended or adjusted under 35 U.S.C. 154(b) by 0 days.

(21) Appl. No.: 09/387,595

(22) Filed: Aug. 31, 1999

(51) Int. Cl.$^7$ .................................................. B01D 29/00
(52) U.S. Cl. .................. 210/765; 210/805; 210/167; 210/202; 210/203; 210/258; 210/259; 210/314; 210/323.1
(58) Field of Search .................................. 210/765, 805, 210/167, 201, 202, 203, 258, 259, 314, 323.1

(56) References Cited

U.S. PATENT DOCUMENTS

| | | |
|---|---|---|
| Re. 31,274 | 6/1983 | Babish et al. . |
| D. 248,942 | 8/1978 | Kniss . |
| D. 290,491 | 6/1987 | Goddard . |
| D. 292,429 | 10/1987 | Spink . |
| D. 306,339 | 2/1990 | Slovak . |
| D. 314,607 | 2/1991 | Kapec et al. . |
| D. 327,468 | 6/1992 | Dea et al. . |
| D. 328,777 | 8/1992 | Thalmann et al. . |
| D. 332,993 | 2/1993 | Dea et al. . |
| D. 352,090 | 11/1994 | Dea et al. . |

(List continued on next page.)

OTHER PUBLICATIONS

The Prestone Pro's Choice™ coolant recycling system advertisement (1 page).
The Prestone Profill™ coolant exchanger advertisement, Model 75075 (1 page).
The ProFlush & Fill™ cooling system service advertisement, Model 75150 (1 page).
The Prestone ProClean™ coolant recycles advertisement, Models 75300 and 75400 (1 page).

(List continued on next page.)

*Primary Examiner*—David A. Simmons
*Assistant Examiner*—Betsey Morrison Hoey
(74) *Attorney, Agent, or Firm*—Merchant & Gould P.C.

(57) ABSTRACT

A multipurpose vehicle coolant recycling device is described. The multipurpose vehicle coolant recycling device includes a pump for pumping coolant through said recycling device, a processing tank for receiving used coolant, a fresh coolant tank for receiving fresh coolant, a filter for removing particulates from coolant, a coolant outlet hose constructed for attachment to a cooling system of a motor vehicle, a coolant inlet hose constructed for attachment to a cooling system of a motor vehicle, and a plurality of control valves for directing flow of coolant through the recycling device. The plurality of control valves are adjustable between a first configuration, a second configuration, a third configuration, and a fourth configuration. The first configuration is constructed for directing coolant from the fresh coolant tank through the pump and through the coolant outlet hose, and directing coolant from a cooling system of a motor vehicle through the coolant inlet hose and into the processing tank. The second configuration is constructed for directing coolant from the processing tank, through the pump, the filter, the coolant outlet hose, and into a cooling system of a motor vehicle, and directing coolant from a cooling system of a motor vehicle through the coolant inlet hose and into the processing tank. The third configuration is constructed for directing coolant from the processing tank, through the pump, the filter, and into the processing tank. The fourth configuration is constructed for directing coolant from the processing tank, through the pump, and into the fresh coolant tank. A method for recycling vehicle coolant is described.

7 Claims, 3 Drawing Sheets

U.S. PATENT DOCUMENTS

| | | |
|---|---|---|
| D. 353,440 | 12/1994 | Ito et al. . |
| D. 359,055 | 6/1995 | Drago et al. . |
| D. 369,647 | 5/1996 | Dea et al. . |
| D. 370,050 | 5/1996 | Dea et al. . |
| 1,582,300 | 4/1926 | Otis . |
| 1,701,824 | 2/1929 | Robinson . |
| 1,742,281 | 1/1930 | Rundlett . |
| 2,187,413 | 1/1940 | Boezi et al. . |
| 2,188,245 | 1/1940 | Middleton . |
| 2,408,183 | 9/1946 | Wood . |
| 3,094,131 | 6/1963 | Williams . |
| 3,115,145 | 12/1963 | Monteath, Jr. . |
| 3,409,218 | 11/1968 | Moyer . |
| 3,540,528 | 11/1970 | Moon . |
| 3,540,588 | 11/1970 | Estabrook . |
| 3,776,384 | 12/1973 | Offer . |
| 3,954,611 | 5/1976 | Reedy . |
| 3,960,208 | 6/1976 | Anthony et al. . |
| 4,015,613 | 4/1977 | Papworth . |
| 4,029,115 | 6/1977 | Wheeler . |
| 4,052,308 | 10/1977 | Higgs . |
| 4,054,150 | 10/1977 | Thomas . |
| 4,083,399 | 4/1978 | Babish et al. . |
| 4,086,930 | 5/1978 | Hiss . |
| 4,109,703 | 8/1978 | Babish et al. . |
| 4,126,108 | 11/1978 | Christensen . |
| 4,127,160 | 11/1978 | Joffe . |
| 4,128,140 | 12/1978 | Riches . |
| 4,161,979 | 7/1979 | Stearns . |
| 4,167,193 | 9/1979 | Magnus et al. . |
| 4,176,708 | 12/1979 | Joffe . |
| 4,209,063 | 6/1980 | Babish et al. . |
| 4,276,914 | 7/1981 | Albertson . |
| 4,293,031 | 10/1981 | Babish et al. . |
| 4,338,959 | 7/1982 | Krueger et al. . |
| 4,343,353 | 8/1982 | Tsopelas . |
| 4,366,069 | 12/1982 | Dudrey et al. . |
| 4,390,049 | 6/1983 | Albertson . |
| 4,513,614 | 4/1985 | Adcock . |
| 4,553,587 | 11/1985 | Traylor . |
| 4,606,363 | 8/1986 | Scales . |
| 4,615,794 | 10/1986 | Belanger . |
| 4,671,230 | 6/1987 | Turnipseed . |
| 4,772,402 | 9/1988 | Love . |
| 4,790,882 | 12/1988 | Barres . |
| 4,793,403 | 12/1988 | Vataru et al. . |
| 4,809,769 | 3/1989 | Vataru et al. . |
| 4,840,223 | 6/1989 | Lee . |
| 4,899,807 | 2/1990 | Vataru et al. . |
| 4,901,786 | 2/1990 | Vataru et al. . |
| 4,911,211 | 3/1990 | Andersen . |
| 4,946,595 | 8/1990 | Miller, Jr. . |
| 4,949,682 | 8/1990 | Klein . |
| 5,021,152 | 6/1991 | Filowitz et al. . |
| 5,039,930 | 8/1991 | Collier et al. . |
| 5,077,513 | 12/1991 | Dea et al. . |
| 5,078,866 | 1/1992 | Filowitz et al. . |
| 5,091,081 | 2/1992 | Hilgren . |
| 5,094,757 | 3/1992 | Light . |
| 5,097,894 | 3/1992 | Cassia . |
| 5,100,562 | 3/1992 | Proctor . |
| 5,167,826 | 12/1992 | Eaton . |
| 5,223,144 | 6/1993 | Woyciesjes et al. . |
| 5,242,273 | 9/1993 | Payne . |
| 5,244,586 | 9/1993 | Hawkins et al. . |
| 5,262,013 | 11/1993 | Beal et al. . |
| 5,267,606 | 12/1993 | Cassia . |
| 5,306,430 | 4/1994 | Dixon et al. . |
| 5,318,700 | 6/1994 | Dixon et al. . |
| 5,382,355 | 1/1995 | Arlozynski . |
| 5,422,008 | 6/1995 | Woyciesjes et al. . |
| 5,429,753 | 7/1995 | Hilgren . |
| 5,441,101 | 8/1995 | Johnson . |
| 5,454,960 | 10/1995 | Newsom . |
| 5,511,590 | 4/1996 | Turcotte et al. . |
| 5,549,832 | 8/1996 | Ishce et al. . |
| 5,809,945 | 9/1998 | Creeron et al. . |
| 5,888,385 | 3/1999 | Ische et al. . |

OTHER PUBLICATIONS

Wynn's Du—All® Power Drain & Fill Bulk Recycler Advertisement (1 page).

Wynn's®, Wynn Oil Company Equipment Operation Manual, pp. 2–24, ®1997 Wynn Oil Company.

US 6,193,895 B1

MULTIPURPOSE VEHICLE COOLANT RECYCLING DEVICE AND METHOD FOR RECYCLING VEHICLE COOLANT

FIELD OF THE INVENTION

The invention relates to a multipurpose vehicle coolant recycling device and to a method for recycling vehicle coolant.

BACKGROUND OF THE INVENTION

The typical internal combustion engine is cooled by providing a coolant (oftentimes called anti-freeze) in cavities that surround the engine. A typical coolant is an aqueous glycol composition such as aqueous ethylene glycol or propylene glycol. These glycols function to reduce the freezing point of coolant and raise the coolant's boiling point, thus assuring that the vehicle's coolant will not freeze or boil over. During operation of the engine, air is constantly drawn into and expelled from the coolant composition. When the coolant is heated during engine operation, air is expelled from the coolant. When the engine is at rest and the temperature of the coolant drops, air is absorbed by the coolant up to the saturation point. This repeated cycle in the life of a coolant provides an oxidation mechanism by which metal ions that are generated by corrosive attack of engine surfaces are subjected to instantaneous oxidation and glycol is thermally oxidized.

Essentially all metal ions when converted to their highest oxidation state form insoluble hydroxides and oxides in the coolant composition, thus forming a precipitate that collects within the engine's coolant chamber. Some of the metals are oxidized to form precipitated hydroxides that deposit on the wall of the coolant chamber and interreact by condensation reactions to form a beneficial oxide layer. This layer protects the engine block from serious corrosion. It would be undesirable to have present in the coolant a component that attacks that beneficial oxide layer and causes its removal. Such action eventually leads to serious corrosion of the engine block. One such component that would attack the beneficial coating if present in the coolant in deleterious amounts, is the chloride ion. It will convert the oxides into soluble chlorides, thus wiping away the beneficial oxide layer. For example, it will convert iron oxides through thermally induced chlorination, to ferric and ferrous chlorides, and aluminum oxides through thermally induced chlorination, to aluminum chloride. These chlorides are very acidic and notorious Friedel-Craft catalysts. They can accelerate the decomposition of the coolant and cause corrosion of metal surfaces.

Other of the precipitates form within the coolant and serve no useful function. Most of these precipitates are of sufficient size so as to deposit from the coolant to the bottom of the coolant chamber. A minor portion, more like a trace amount, of the precipitates have such a small size (more like microscopic in size) that they remain dispersed in the coolant. Eventually these precipitates have to be removed and thus flushing of the coolant system is an appropriate procedure.

The trace amounts of these metal hydroxides that remain suspended particulates within the coolant will, with time, chemically interreact to form dimeric and oligomeric condensates. Such condensates remain suspended (dispersed) in the coolant. These condensates are difficult to remove by filtration because they have an extremely small particle size. Because the metal atoms in these condensates are at their maximum state of oxidation, further oxidation of the coolant will not cause these condensates to be further oxidized. Nor will further oxidation cause these condensates to drop out of dispersion in the coolant.

There are described in the literature a variety of systems directed to the treatment of spent engine coolant that allows for the recovery and refurbishing of such coolant. Illustrative of such technology are a series of patents to the Wynn Oil Company, such as U.S. Pat. Nos. 4,083,393, 4,091,865, 4,109,703, 4,178,134, 4,209,063, 4,293,031, 4,791,890, 4,793,403, 4,809,769, 4,899,807, 4,901,786, 5,021,152, 5,078,866, 5,306,430, 5,318,700 and Re. 31,274.

PCT/US92/00555 and U.S. Pat. No. 4,946,593, to Miller, describe a process for the treatment of a spent coolant outside of the engine.

A system that was commercialized in the past was sold by ECP, Inc., Westchester, Ill. It involved the vacuum removal of spent coolant from an engine, subjecting the coolant to filtration, and the addition of a "Coolant System Protector" to the filtered spent coolant.

Woyciesjes, et al., U.S. Pat. No. 5,223,144, describe a process for treating an aqueous spent coolant composition by adjusting its pH to the acid range, e.g., 4.0–7.5, by adding an acid, and then adding acid salts to effect precipitation of heavy metal impurities in salt or complex form from the spent coolant. Also included in the process description is the treatment of the acidic coolant composition with coagulating and flocculating agents, filtration of the acidic coolant, passing the acidic coolant through an activated carbon bed, through a distillation step, and a skimming step to remove precipitates.

A vehicle coolant recycling device is described by U.S. Pat. No. 5,549,832 to Ische, et al. The assignee of this patent is Century Manufacturing Company of Minneapolis, Minn.

SUMMARY OF THE INVENTION

A multipurpose vehicle coolant recycling device is provided by the invention. The multipurpose vehicle coolant recycling device includes a pump for pumping coolant through said recycling device, a processing tank for receiving used coolant, a fresh coolant tank for receiving fresh coolant, a filter for removing particulates from coolant, a coolant outlet hose constructed for attachment to a cooling system of a motor vehicle, a coolant inlet hose constructed for attachment to a cooling system of a motor vehicle, and a plurality of control valves for directing flow of coolant through the recycling device. The plurality of control valves are adjustable between a first configuration, a second configuration, a third configuration, and a fourth configuration. The first configuration is constructed for directing coolant from the fresh coolant tank through the pump and through the coolant outlet hose, and directing coolant from a cooling system of a motor vehicle through the coolant inlet hose and into the processing tank. The second configuration is constructed for directing coolant from the processing tank, through the pump, the filter, the coolant outlet hose, and into a cooling system of a motor vehicle, and directing coolant from a cooling system of a motor vehicle through the coolant inlet hose and into the processing tank. The third configuration is constructed for directing coolant from the processing tank, through the pump, the filter, and into the processing tank. The fourth configuration is constructed for directing coolant from the processing tank, through the pump, and into the fresh coolant tank.

A method for recycling vehicle coolant is provided by the invention. The method includes steps of:

(a) attaching a coolant inlet hose and a coolant outlet hose to a cooling system of a motor vehicle to provide fluid connectivity with coolant provided in the cooling system, wherein the coolant provided in the cooling system comprises used coolant for recycling;

(b) pumping fresh coolant into said cooling system from a fresh coolant tank to displace at least part of the used coolant in the cooling system into a processing tank;

(c) chemically treating used coolant in the processing tank to provide chemically treated coolant;

(d) pumping chemically treated coolant through a filter to remove 0 particulates and provide filtered coolant;

(e) treating the filtered coolant with a corrosion inhibitor; and (f) pumping filtered coolant to a fresh coolant tank.

The method can include an additional step of detaching the coolant inlet hose and the coolant outlet hose from the cooling system after a sufficient amount of used coolant in the cooling system has been displaced by fresh coolant.

DETAILED DESCRIPTION OF THE PREFERRED EMBODIMENT

Figure 1:
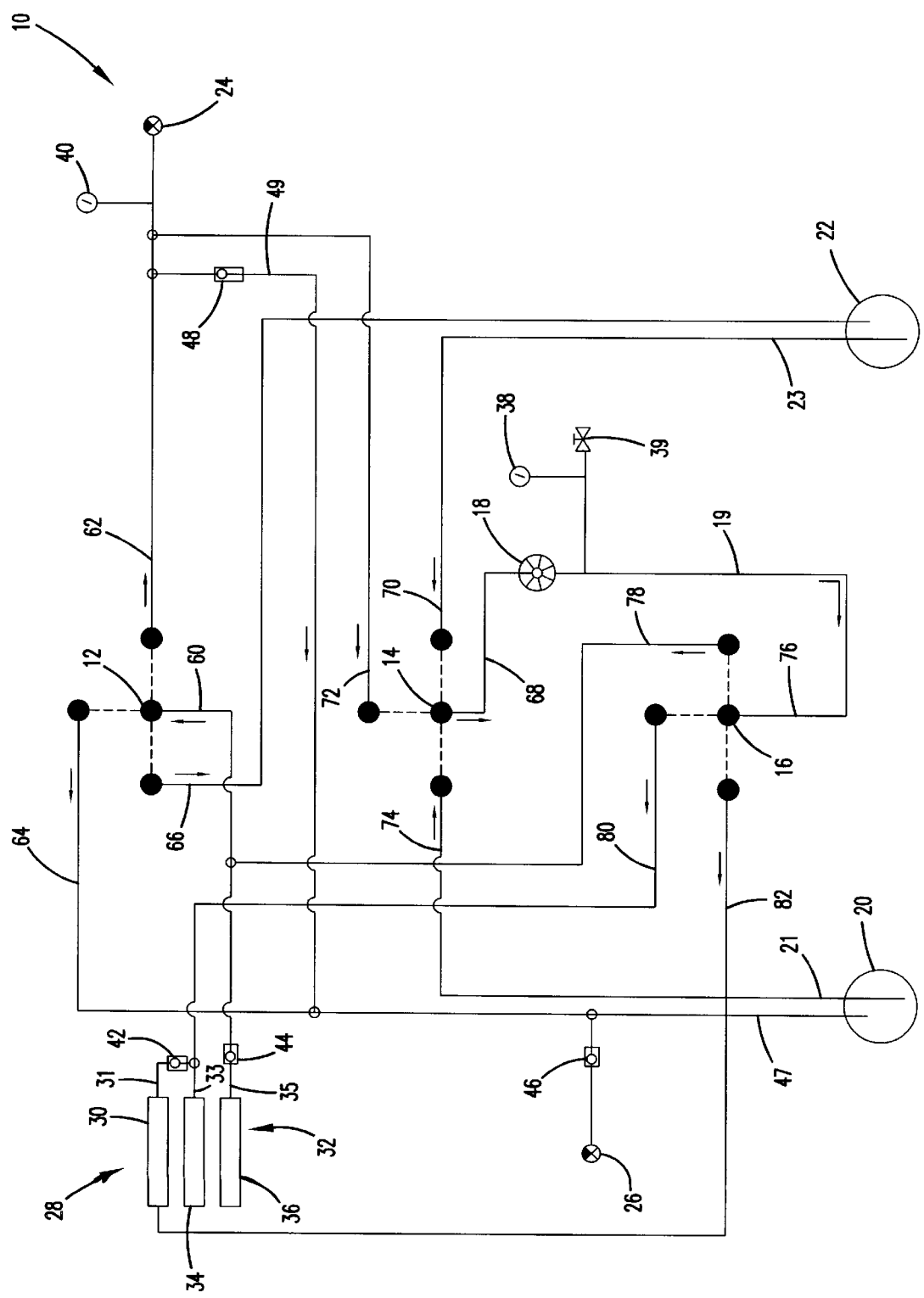
FIG. 1 is a schematic illustration of the multipurpose vehicle coolant recycling device according to the invention (i.e., the coolant recycler) for carrying out the method of the invention.

The multipurpose vehicle coolant recycling device according to the invention can be referred to more simply as the coolant recycler. The coolant recycler is capable of recovering and recycling used coolant to provide a coolant which can be used in the cooling system of a motor vehicle. In general, a coolant includes an aqueous glycol composition such as aqueous ethylene glycol or aqueous propylene glycol. Over time, the coolant in a motor vehicle cooling system becomes contaminated and should be replaced with fresh coolant. Coolant having an amount of contaminants so that it should be replaced can be referred to as used coolant. New coolant or coolant which has been recycled to an extent acceptable for reintroduction into the cooling system of a motor vehicle can be referred to as fresh coolant.

The recycling of used coolant includes the removal of certain particulate contaminants and the incorporation of an inhibiting package for renewing anticorrosion and lubricity properties of the coolant. U.S. Pat. No. 5,888,385 to Ische, et al. describes the chemistry which can be practiced according to the invention for removing metals from the used coolant and adding a package including corrosion inhibitors, buffering agents, and alkali for providing a fresh coolant for use in the cooling system of motor vehicles.

The coolant recycler is equipped to operate in several ways. The coolant recycler can operate as an exchange device. That is, the coolant recycler, when connected to the cooling system of a motor vehicle, can flush used coolant from the cooling system and replace it with fresh coolant. Fresh coolant includes new coolant, recycled coolant, and mixtures of new and recycled coolant. The exchange operation can be referred to as a "flush and fill" operation.

The coolant recycler can recycle or recover used coolant. There are generally two techniques for recycling used coolant. The first technique can be referred to as the recycle on motor vehicle technique. In this technique, the used coolant continuously flows through the coolant recycler and the cooling system of a motor vehicle. The treatment includes treatment with chemicals and filtering the used coolant. Another technique for recycling or reclaiming used coolant can be referred to as the internal recycle technique. In this mode of operation, used coolant which has been transferred from the cooling system of a motor vehicle to the coolant recycler is treated with chemicals and filtered. Once the recycled coolant reaches a level that can be characterized as fresh coolant, it can then be introduced into the cooling system of another vehicle. In general, it is expected that the fresh coolant will displace used coolant in the cooling system of a motor vehicle by the exchange operation. The recovered used coolant will then be recycled by the internal recycle technique.

The coolant recycler can function as a flushing or back-flushing device. In this operation, the coolant recycler can generate fluid pressure to help dislodge contaminants from the walls of the cooling system of a motor vehicle. The direction of the flow can be provided in the normal operational flow direction of coolant in the cooling system of a motor vehicle or in the reverse direction. The coolant recycler can function to pressurize the cooling system of a motor vehicle for detection of leaks. In addition, the coolant recycler can function to drain used coolant from the cooling system of a motor vehicle. The coolant recycler can be used to draw a vacuum on the used coolant in a cooling system to remove coolant to about the water pump level in the cooling systems.

It should be appreciated that the coolant recycler can be used to practice any one or more of the above described modes of operation. It is not necessary for the coolant recycler to practice all of the above described operations.

Now referring to FIG. 1, a schematic illustration demonstrating the operation of the coolant recycler 10 is shown. The coolant recycler 10 includes three control valves 12, 14, and 16. The control valves direct the flow of fluid flow through the coolant recycler, and thereby control the operation of the coolant recycler 10. By manipulating the control valves 12, 14, and 16, the coolant recycler 10 can be used to exchange coolant, recycle used coolant, flush and/or backflush, pressurize the cooling system of a motor vehicle, or drain coolant from the cooling system of a motor vehicle. The arrows shown in FIG. 1 describe the direction of fluid or coolant flow through the conduits or lines of the coolant recycler 10.

The coolant recycler 10 includes a pump which drives the fluid through the coolant recycler 10. The pump 18 can be powered by electricity or air. Preferably, the pump is a 1 to 10 gpm pump which Applicants have found to be sufficient for driving the fluid flow in the coolant recycler 10 and through the cooling system of a motor vehicle.

A processing tank 20 is provided for receiving used coolant. Chemicals can be added to the coolant in the processing tank for treating the coolant. In general, the chemicals described by U.S. Pat. No. 5,888,385 to Ische, et al. are added to processing tank 20. A fresh coolant tank 22 is provided for receiving new coolant or recycled coolant. It is desirable to have all of the treating and processing of the used coolant taking place in the processing tank 20. Preferably, it is only when the coolant becomes sufficiently processed to be characterized as fresh coolant that is transferred to the fresh coolant tank 22. Of course, there is no requirement that all of the processing and treatment of the used coolant occur in the processing tank 20. Certainly, certain steps can be practiced in the fresh coolant tank 22. It should be understood that the following description of the invention can be modified to incorporate processing and treatment steps in the fresh coolant tank 22. It is generally a matter of convenience to keep the processing and treatment steps in the processing tank 20 to insure that the fresh coolant tank 22 remains clean. The processing tank 20 and the fresh coolant tank 22 are each of sufficient size to hold the quantity of coolant provided in the cooling system of a motor vehicle.

Vehicle hoses 24 and 26 are provided for connecting to the cooling system of a motor vehicle. Preferably, the vehicle hose 24 is provided for transferring fresh coolant into the cooling system, and vehicle hose 26 is provided for receiving spent coolant from the cooling system of the motor vehicle.

A series of filters 28 are provided for removing impurities from the used coolant. The series of filters 28 include a carbon filter 30 and particulate removal filters 32. The particulate removal filters 32 include two filters for removing different size particulates. A first particulate removal filter 34 can be provided for removing relatively large size particulates, and a second particulate removal filter 36 can be provided for removing finer size particulates. In general, the flow of the fluid through the particulate removal filters 32 should be directed so that the fluid flows through the first particulate removal filter 34 and then through the second particulate removal filter 36. Flow in this manner reduces the incident of large particulates clogging the second particulate filter 36. Although a preferred embodiment of the invention shows two particulate removal filters, it should be understood that the invention can be practiced with a single particulate removal filter. It is expected that a single particulate removal filter will result in more frequent filter changes than two or more filters arranged in series and being designed for removal of different sized particulates. Preferably, the first particulate removal filter 34 is a 50 mF filter and the second particulate removal filter 36 is a 5 mF filter.

A filter pressure gauge 38 is provided for measuring the back pressure generated by the carbon filter 30 and/or the particulate removal filters 32. In general, when the filter pressure gauge 38 reaches a predetermined level, it is an indication that it is appropriate to replace the filters. A spigot 39 is provided to provide sampling of coolant, when desired, for pH and/or clarity.

A cooling system pressure gauge 40 is provided for measuring the pressure generated in the cooling system of a motor vehicle. A pressure relief valve 48 is provided to prevent excessive pressure from building up in the cooling system of a motor vehicle. In general, if the pressure in the cooling system is too high, the pressure relief valve 48 opens allowing coolant to flow via lines 49 and 47 into the processing tank 20. Preferably, when the pressure exceed 30 psi, the valve 48 opens. A high pressure measurement by the pressure gauge 40 can be an indication of plugging in the cooling system.

A plurality of check valves 42, 44, and 46 are provided for directing flow of fluid in one direction. The check valves allow the fluid to flow in one direction through the check valve, but prevent fluid flow in the opposite direction. For example, check valve 42 provides for one way flow from the carbon filter outlet line 31 to the particulate filter inlet line 33. Check valve 44 provides for one way flow from the particulate filter outlet line 35 to line 60. Check valve 46 provides one way flow from the vehicle hose 26 to the processing tank input line 47. A spigot 39 is provided for sampling coolant. Often it is desirable to obtain a sample of coolant from the spigot 39 to sample pH and clarity.

The operation of the coolant recycler 10 can be controlled by directing the settings on the control valves 12, 14, and 16. Control valve 12 provides selection of flow of fluid from line 60 to any one of lines 62, 64, and 66. Control valve 14 directs flow of fluid to line 68 from any one of lines 70, 72, and 74. Control valve 16 provides control of fluid from line 76 to any one of lines 78, 80, and 82.

When the coolant recycler 10 is operating as an exchange device, the vehicle hoses 24 and 26 are attached to the cooling system of a motor vehicle, and control valve 12 is manipulated to direct fluid flow from line 60 to line 62, control valve 14 is manipulated to direct fluid flow from line 70 to line 68, and control valve 16 is manipulated to direct fluid flow from line 76 to line 78. Accordingly, when the coolant recycler 10 is turned on, the pump 18 causes fresh coolant to flow from the new coolant tank 22 into the cooling system of the motor vehicle via the vehicle hose 24. The pressure generated in the cooling system of the motor vehicle, in turn, displaces used coolant from the cooling system via vehicle hose 26 through the check valve 46 and into the processing tank 20. In particular, fresh coolant flows from the fresh coolant tank 22 via fresh coolant outlet line 23, through line 70, control valve 14, line 68, pump 18, pump outlet line 19, control valve 16, line 78, line 60, control valve 12, line 62, and outlet hose 24. Used or dirty coolant flows into the coolant recycler 10 via inlet hose 26, check valve 46, processing tank inlet line 47, and into processing tank 20.

When the coolant recycler 10 operates to clean, reclaim, or recycle coolant, there are essentially two modes of operation. The first mode of operation involves cleaning coolant as the coolant recycler 10 is attached to the cooling system of a motor vehicle. This mode of operation can be referred to as the recycle on vehicle mode of operation. The coolant provided in a cooling system of a motor vehicle is recycled and returned to the same cooling system. The second mode of operation involves an exchange operation followed by a recycling operation which takes place within the coolant recycler 10. Accordingly, after an exchange, the used coolant which is recovered in the processing tank 20 can be recycled and transferred to the fresh coolant tank 22. The recycled coolant can then be directed to the cooling system of another vehicle.

The recycle on vehicle mode of operation includes attaching the vehicle hoses 24 and 26 to a cooling system. Control valve 12 is adjusted to control flow of fluid from line 60 to line 62, control valve 14 is adjusted to control flow of fluid from line 74 to line 68, and control valve 16 is adjusted to control flow of fluid from line 76 to line 80 and later to line 82. During the initial phases of the cleaning operation, the fluid is directed through the particulate removal filters 32 via line 80. During the final stages of cleaning, the fluid is directed through the carbon filter 30 and then through the particulate removal filters 32 via line 82.

In operation, used coolant is forced from the cooling system through vehicle hose 26 and check valve 46 into the processing tank where it is treated with chemicals. Processed fluid from the processing tank 20 is drawn through processing tank outlet line 21, line 74, control valve 16, line 68, and through the pump 18. The fluid is then forced through pump outlet line 19, lines 76, control valve 16, line 80, and through the particulate removal filters 32. The fluid then flows through filter outlet line 35, check valve 44, line 60, control valve 12, line 62 and to the cooling system via the vehicle hose 24. In this manner, the used coolant is processed by chemical treatment and filtering to remove particulates. The coolant then flows through the cooling system of a motor vehicle. It is believed that the residence time created by the flow of the coolant through the motor vehicle assists the action of the chemical which were added in the processing tank 20. In addition, it is believed that continuous flow through the cooling system helps clean the cooling system.

After a sufficient amount of particulates have been removed from the coolant, control valve 16 is adjusted to control flow of fluid from line 76 to line 82. This causes the fluid to flow through the carbon filter 30, carbon filter outlet line 31, check valve 42, particulate filter inlet line 33, particulate removal filters 32 and then into the cooling system. Carbon filter 30 is provided for removing certain organic chemicals from the coolant.

When the coolant recycler is operating to recycle coolant from an exchange operation, the vehicle hoses 24 and 26 need not be connected to a cooling system. Of course, they can be connected to a cooling system without adversely affecting the recycle operation. The control valve 12 is adjusted to direct flow of fluid from line 60 to line 64. The control valve 14 is adjusted to direct flow of fluid from line 74 to line 68. The control valve 16 is adjusted to direct flow of fluid from line 76 to line 80, and then later adjusted to direct flow from line 76 to line 82. The operation of control valve 16 is for directing flow of fluid through either the particulate removal filters 32 or the series of filters 28, as described above.

Used coolant in the processing tank 20 is treated with chemicals. The used coolant is then drawn out of the processing tank 20, through processing tank outlet line 21, lines 74 and 68, and through the pump 18. The fluid then flows through lines 76 and 80 and through the particulate removal filters 32. The filtered coolant then flows through lines 60 and 64 and through the processing tank inlet line 47 and back into the processing tank 20. This processing loop is continued until the coolant is sufficiently cleaned or recycled. Once it is desired to run the coolant through carbon filter 30, the control valve 16 is adjusted to direct flow from line 76 to line 82.

Once the coolant is sufficiently cleaned or recycled, the fresh coolant can be transferred to the fresh coolant tank 22. The control valve 12 is adjusted to direct flow of fluid from line 60 to line 66, the control valve 14 is adjusted to direct flow from line 74 to line 68, and the control valve 16 is adjusted to direct flow from line 76 to line 78. As a result, fresh coolant flows from the processing tank 20, through the pump 18, and into the fresh coolant tank 22. If desirable, the fresh coolant can be run through the particulate filters 32 or the series of filters 28 prior to introduction into the fresh coolant tank 22. The fresh coolant provided in the fresh coolant tank 22 is then available for exchanging into a cooling system of another motor vehicle.

The coolant recycler 10 can be used to provide flushing and back flushing operations. The flushing and back flushing operations are essentially the same operation except that a clamp can be used to redirect flow in the cooling system of a motor vehicle. Accordingly, in providing a flushing operation, the control valve 12 is adjusted to control flow of fluid from line 60 to line 62, control valve 14 is adjusted to provide flow from line 74 to line 68, and control valve 16 is adjusted to provide flow from line 76 to line 78. Accordingly, the pump 18 causes fluid to flow into the cooling system which, in turn, causes fluid to flow out of the cooling system in a closed loop. The flushing and back flushing operations can be used to dislodge particulates within the cooling system.

The coolant recycler 10 can be used to pressurize a cooling system for detection of leaks. This operation is practiced by attaching hose 24 to a cooling system but not attaching hose 26. The pump 18 is gradually increased in power to increase the pressure within the cooling system. In general, the pressure in the cooling system is increased up to about 20 psi or about 25 psi.

Figure 2:
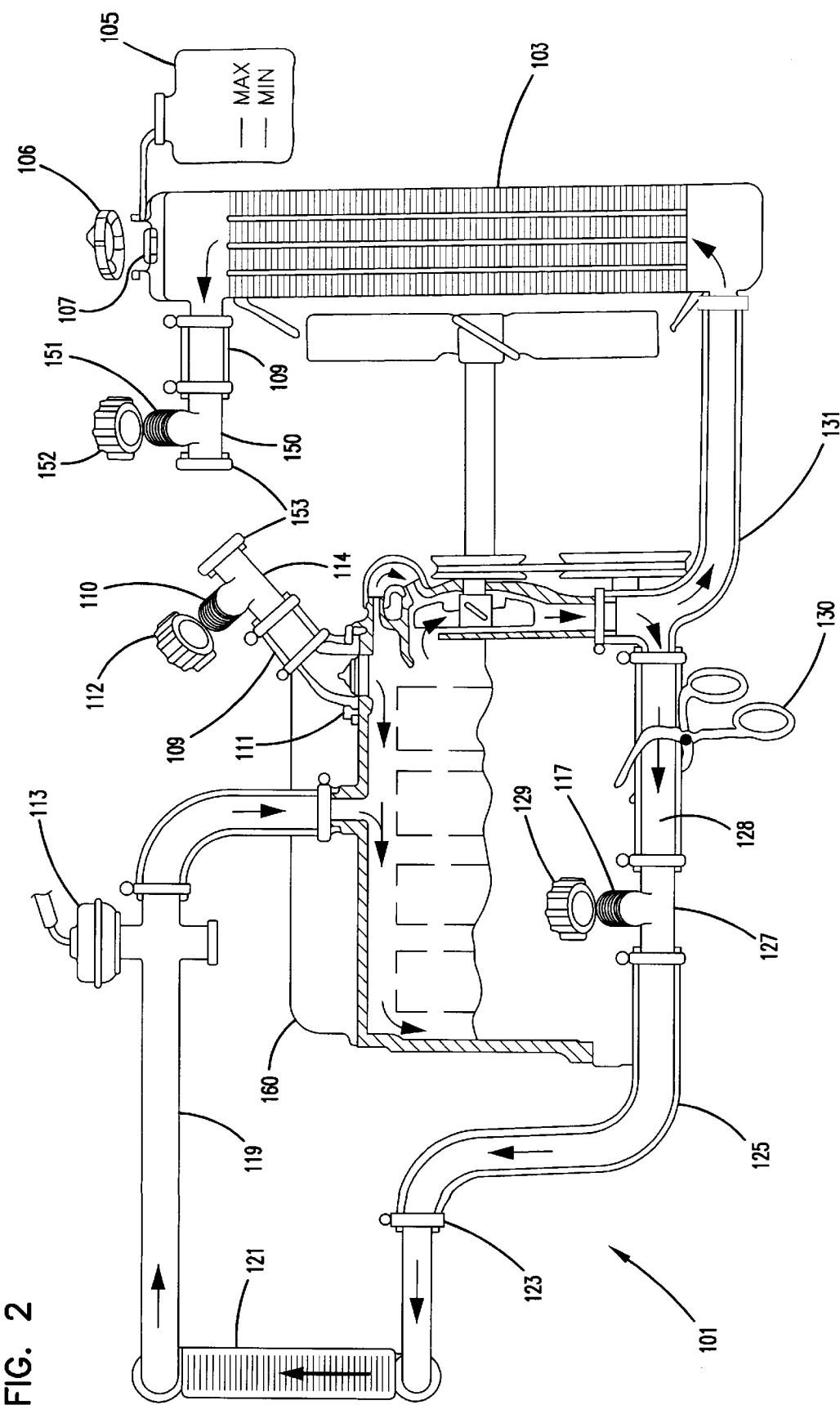
FIG. 2 is a schematic view of an internal combustion engine showing the connection sights for the lines from the coolant recycler of FIG. 1.

Now referring to FIG. 2, the cooling system of a typical vehicle is illustrated at reference numeral 101. The components of the cooling system include radiator 103, recovery or overflow tank 105, radiator opening 107, radiator cap 106, upper radiator hose 109 with Tee 114 containing opening 110 and associated cap 112 and Tee 150 containing opening 151 and associated cap 152, thermostat 111, heater control valve 113, supply heater hose 119, heater core 121, hose clamp 123, return heater hose 125, Tee 127, cap 129 for Tee opening 117, return hose 128, and lower radiator hose 131. Pinch pliers 130 is provided to close off flow during the process. The arrows shown in FIG. 2 represent the back-flushing flow of coolant within the radiator 103, heater core 121, and engine block 160. Both of Tees 114 and 150 are capped off at ends 153.

Two general techniques are available for attaching the hoses 24 and 26 to the cooling system 101. A first technique involves attaching one of the hoses to the Tee 127, and the other hose to the radiator opening 107. The other technique involves attaching one hose to the Tee 114 and the other hose to the Tee 150. In the case of attaching the hoses to the Tees 114 and 150, an obstruction is provided between the two Tees to provide flow of coolant through the cooling system 101 and the engine block 160. In addition, make-up coolant can be introduced through the overflow tank 105 or the radiator opening 107.

Figure 3:
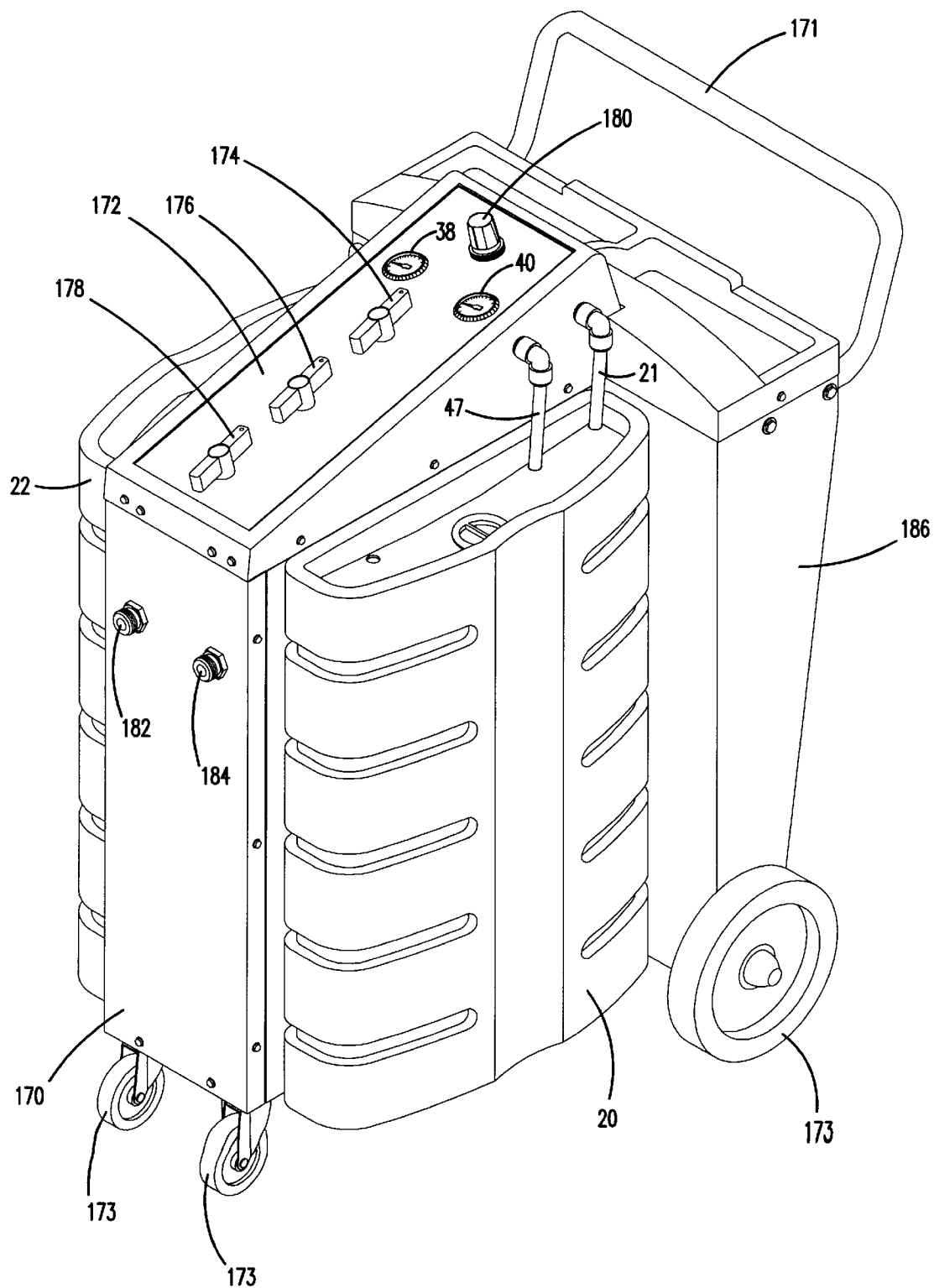
FIG. 3 is a perspective view of an embodiment of the coolant recycler.

Now referring to FIG. 3, the coolant recycler 10 is shown on a cart 170 which allows the operator of the coolant recycler to place the coolant recycler in close proximity to the cooling system of a motor vehicle. A handle 171 and wheels 173 allow an operator to conveniently move the coolant recycler 10. A console panel 172 is provided for explaining the operation of the coolant recycler 10. The console panel 172 includes dials 174, 176, and 178 for controlling the control valves 12, 14, and 16, respectively. An air regulator 180 is provided for activating the pump 18 and adjusting the flow of coolant through the coolant recycler 10. The inlet and outlet hoses can be attached to inlet and outlet ports 182 and 184. A filter container 186 is provided for containing the series of filters 28. Although not shown, an air inlet is provided for operating the pump 18. Alternatively, the pump 18 can be operated by electrical energy. Treatment chemicals and inhibitor package can be introduced through opening 190 in the processing tank 20.

An operator would readily appreciate how the coolant recycler can be used according to the invention. In general, it is expected that an exchange operation would take 5 minutes or less, depending on the speed of the pump and the volume of coolant displaced. In addition, it is expected that the internal recycle operation and the on vehicle recycle operation would take between about 10 minutes and about 30 minutes, with the particulate removal operation taking between about 10 minutes and about 20 minutes and the organics removal operation taking between about 5 minutes and about 10 minutes. It is expected that the transfer operation (from processing tank to fresh coolant tank) will take less than about 5 minutes.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A multipurpose vehicle coolant recycling device comprising:

pump for pumping coolant through said recycling device;

processing tank for receiving used coolant;

fresh coolant tank for receiving fresh coolant;

filter for removing particulates from coolant;

coolant outlet hose constructed for attachment to a cooling system of a motor vehicle;

coolant inlet hose constructed for attachment to a cooling system of a motor vehicle;

plurality of control valves for directing flow of coolant through said recycling device, said plurality of control valves adjustable between a first configuration, a second configuration, a third configuration, and a fourth configuration;

said first configuration is constructed for directing coolant from said fresh coolant tank through said pump and through said coolant outlet hose, and directing coolant from a cooling system of a motor vehicle through said coolant inlet hose and into said processing tank;

said second configuration is constructed for directing coolant from said processing tank, through said pump, said filter, said coolant outlet hose, and into a cooling system of a motor vehicle, and directing coolant from a cooling system of a motor vehicle through said coolant inlet hose and into said processing tank;

said third configuration is constructed for directing coolant from said processing tank, through said pump, said filter, and into said processing tank; and said fourth configuration is constructed for directing coolant from said processing tank, through said pump, and into said fresh coolant tank.

2. A multipurpose vehicle coolant recycling device according to claim 1, wherein said pump and said filter are arranged to provide flow of coolant through said pump and then through said filter.

3. A multipurpose vehicle coolant recycling device according to claim 1, wherein said filter comprises at least two particulate removal filters.

4. A multipurpose vehicle coolant recycling device according to claim 1, wherein said filter comprises a combination of a carbon filter and a particulate removal filter.

5. A multipurpose vehicle coolant recycling device according to claim 1, wherein said plurality of control valves can be adjusted to a fifth configuration which is constructed for drawing coolant from a cooling system of a motor vehicle through said pump and into said processing tank.

6. A method for recycling vehicle coolant, the method comprising steps of:

(a) attaching a coolant inlet hose and a coolant outlet hose to a cooling system of a motor vehicle to provide fluid connectivity with coolant provided in the cooling system, wherein the coolant provided in the cooling system comprises used coolant for recycling;

(b) pumping fresh coolant into said cooling system from a fresh coolant tank to displace at least part of the used coolant in the cooling system into a processing tank;

(c) chemically treating used coolant in the processing tank to provide chemically treated coolant;

(d) pumping chemically treated coolant through a filter to remove particulates and provide filtered coolant;

(e) treating the filtered coolant with a corrosion inhibitor; and (f) pumping filtered coolant to a fresh coolant tank.

7. A method for recycling vehicle coolant according to claim 6, further comprising a step of:

(a) detaching the coolant inlet hose and the coolant outlet hose from the cooling system after a sufficient amount of used coolant in the cooling system has been displaced by fresh coolant.

* * * * *